United States Patent
David

(10) Patent No.: US 9,612,893 B2
(45) Date of Patent: Apr. 4, 2017

(54) PERIPHERAL WATCHDOG TIMER

(71) Applicant: Silicon Laboratories Inc., Austin, TX (US)

(72) Inventor: Thomas Saroshan David, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 62 days.

(21) Appl. No.: 14/709,204

(22) Filed: May 11, 2015

(65) Prior Publication Data

US 2016/0335149 A1 Nov. 17, 2016

(51) Int. Cl.
G06F 11/00 (2006.01)
G06F 11/07 (2006.01)

(52) U.S. Cl.
CPC ...... *G06F 11/0757* (2013.01); *G06F 11/0706* (2013.01)

(58) Field of Classification Search
USPC .......................................................... 714/55
See application file for complete search history.

(56) References Cited

U.S. PATENT DOCUMENTS

| | | |
|---|---|---|
| 4,881,169 A | 11/1989 | Tanaka et al. |
| 5,226,152 A | 7/1993 | Klug et al. |
| 5,280,628 A | 1/1994 | Nakayama |
| 5,355,414 A | 10/1994 | Hale et al. |
| 5,860,028 A | 1/1999 | Pecore |
| 6,092,162 A | 7/2000 | Chiang |
| 6,112,320 A | 8/2000 | Dien |
| 6,141,774 A | 10/2000 | Mattheis |
| 6,212,589 B1 | 4/2001 | Hayek et al. |
| 6,324,123 B1 | 11/2001 | Durso |
| 6,442,632 B1 | 8/2002 | Hayek et al. |
| 6,634,769 B2 | 10/2003 | Beasley, Jr. |
| 6,665,802 B1 | 12/2003 | Ober |
| 6,675,320 B1 | 1/2004 | Schumacher et al. |
| 6,697,254 B1 | 2/2004 | King et al. |
| 6,778,006 B2 | 8/2004 | Lin |
| 6,963,942 B2 | 11/2005 | Benyukhis et al. |
| 7,065,667 B2 | 6/2006 | Sakaino et al. |
| 7,360,253 B2 | 4/2008 | Frank et al. |
| 7,406,634 B2 | 7/2008 | Kumar |
| 7,886,177 B2 | 2/2011 | Bennett et al. |
| 8,639,851 B2 | 1/2014 | Laurentiu |
| 8,856,406 B2 | 10/2014 | Kris et al. |

(Continued)

*Primary Examiner* — Sarai Butler
(74) *Attorney, Agent, or Firm* — Cesari & Reed LLP; Ronald M. Reed

(57) ABSTRACT

In some embodiments, a circuit may include a plurality of peripherals and a peripheral watchdog timer circuit coupled to at least one of the plurality of peripherals. The peripheral watchdog timer circuit may be configured to count clock cycles and concurrently to detect activity associated with at least one of the plurality of peripherals. The peripheral watchdog timer circuit may be configured to reset a count in response to detecting the activity. In some embodiments, the peripheral watchdog timer circuit may be configured to generate an alert signal when the count exceeds a threshold count before detecting the activity. In some embodiments, the peripheral watchdog timer circuit is configured to initiate a reset operation when the alert is not serviced within a period of time.

21 Claims, 5 Drawing Sheets

(56) References Cited

U.S. PATENT DOCUMENTS

| | | |
|---|---|---|
| 8,909,995 B2 | 12/2014 | Ozawa |
| 2007/0088974 A1* | 4/2007 | Chandwani ......... G06F 11/0781 |
| | | 714/6.11 |
| 2007/0220181 A1 | 9/2007 | Jung et al. |
| 2008/0015713 A1 | 1/2008 | Pannwitz |
| 2008/0162976 A1 | 7/2008 | Bennett et al. |
| 2008/0307140 A1 | 12/2008 | Goldstein et al. |
| 2010/0036517 A1* | 2/2010 | Takizawa ............ G06F 11/0736 |
| | | 700/110 |
| 2010/0049888 A1 | 2/2010 | Zhang et al. |
| 2010/0228894 A1* | 9/2010 | Strulovici ............... G06F 12/08 |
| | | 710/25 |
| 2012/0084587 A1 | 4/2012 | Adams et al. |
| 2012/0151237 A1 | 6/2012 | Huang |
| 2012/0254596 A1 | 10/2012 | Yang et al. |
| 2013/0198500 A1 | 8/2013 | Bowling |
| 2013/0227181 A1 | 8/2013 | Martin et al. |
| 2013/0238914 A1 | 9/2013 | Adams et al. |
| 2013/0241626 A1 | 9/2013 | Bowling et al. |
| 2013/0254598 A1 | 9/2013 | Yamashita et al. |
| 2013/0297831 A1 | 11/2013 | Laurentiu |
| 2014/0075052 A1 | 3/2014 | Kris et al. |
| 2014/0304439 A1 | 10/2014 | Elahi et al. |
| 2015/0046614 A1 | 2/2015 | Pedersen et al. |

\* cited by examiner

PERIPHERAL WATCHDOG TIMER

FIELD

The present disclosure is generally related to processing circuits and methods, and more particularly, to a peripheral watchdog timer configured to monitor peripheral activity.

BACKGROUND

Conventionally, processing circuit may include a central processing unit (CPU) that has a CPU activity monitor that can be updated via a software task, indicating that the CPU is functioning and that the code thread is working The activity monitor may be used to determine when the CPU is inactive and may communicate such information to a power management system to reduce power, clock speed, or other parameters of the CPU or other circuitry to reduce power consumption.

SUMMARY

In some embodiments, a circuit may include a plurality of peripherals and a peripheral watchdog timer circuit coupled to at least one of the plurality of peripherals. The peripheral watchdog timer circuit may be configured to count clock cycles and concurrently to detect activity associated with at least one of the plurality of peripherals. The peripheral watchdog timer circuit may be configured to reset a count in response to detecting the activity. In some embodiments, the peripheral watchdog timer circuit may be configured to generate an alert signal when the count exceeds a threshold count before detecting the activity.

In other embodiments, a circuit may include a plurality of peripherals and a peripheral watchdog timer circuit coupled to at least one of the plurality of peripherals. The peripheral watchdog timer circuit may be configured to count clock cycles and concurrently to detect activity associated with at least one of the plurality of peripherals. The peripheral watchdog timer circuit may be configured to generate an alert signal when a count exceeds a threshold count before detecting the activity. In some embodiments, the peripheral watchdog timer circuit may be configured to reset the count in response to detecting the activity.

In still other embodiments, a method may include adjusting a count of a peripheral watchdog timer circuit in response to a clock signal and monitoring at least one peripheral circuit to detect activity. The method may further include generating an alert signal when the count crosses a threshold before detecting the activity.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
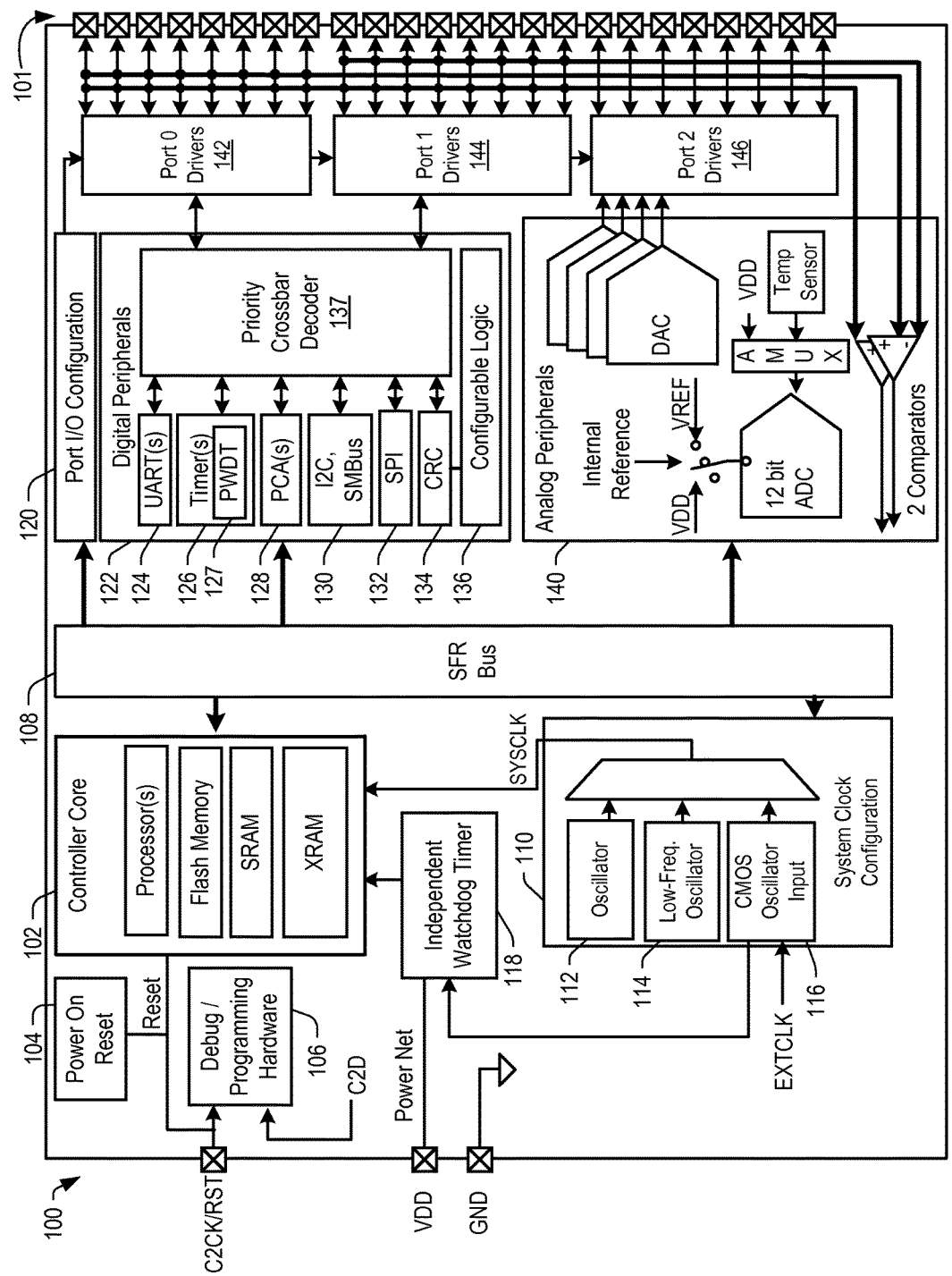
FIG. 1 is a block diagram of an integrated circuit including a peripheral watchdog timer, in accordance with some embodiments of the present disclosure.

Embodiments of circuits, systems, and methods are described below that may be configured to monitor one or more autonomous peripheral devices to detect peripherals that have stopped functioning, to detect peripheral operations that have stopped, or any combination thereof. In some embodiments, an integrated circuit may integrate multiple peripherals. Such peripherals may include disk drive controllers, keyboard controllers, input/output devices, and other components. Peripherals may also include circuits, such as sensor circuits, detectors, and the like, some of which may operate autonomously relative to a processor of the system. As used herein, the term "autonomous peripheral device" refers to a device that may operate outside of the control of a processor. Examples of autonomous peripheral devices may include sensors and other circuits that may operate while the processor is in a low-power or idle state. Such devices may capture data and provide the data to a register, for example.

In some embodiments, a peripheral watchdog timer circuit may define a count corresponding to a time period, which may represent a period of time between which one or more peripherals are expected to provide a signal, such as a data output, to a bus, an I/O port or pin, a register, another circuit, or any combination thereof. The peripheral watchdog timer circuit may count a number of clock cycles or may increment (or decrement) a count in response to clock cycles of a clock signal. In some embodiments, the peripheral watchdog timer circuit may be coupled to one or more peripherals to detect a trigger event, such as any activity indicating operation of a peripheral. In some embodiments, the peripheral may be coupled to the peripheral watchdog timer circuit via a bus or through an I/O port or pin. If the trigger event is detected before the count of the peripheral watchdog timer circuit crosses a threshold, the watchdog timer circuit is reset. Otherwise, when the count crosses the threshold before detecting the trigger event, the peripheral watchdog timer circuit may generate an alert, such as an interrupt.

In some embodiments, the alert may be sent to a processor or may be sent to another control circuit to reset the peripheral device or to investigate the problem. In some embodiments, the peripheral watchdog timer circuit may be configured to look at a plurality of peripherals and to identify event chains that have stalled or that may be stuck so that the system does not hang. In some embodiments, the peripheral watchdog timer may be configured to monitor a chain of events and to reset when all of the events are triggering. When any one of the chain of events fails to trigger within a period of time, the peripheral watchdog timer circuit may generate the alert.

In some embodiments, the peripheral watchdog timer circuit may monitor servicing of the interrupt. If the interrupt is serviced before the count of the peripheral watchdog timer circuit crosses a second threshold without the interrupt being serviced, the peripheral watchdog timer circuit may initiate a reset operation, to reset the processor. An example of an integrated circuit including a peripheral watchdog timer circuit is described below with respect to FIG. 1.

FIG. 1 is a block diagram of an integrated circuit 100 including a peripheral watchdog timer, in accordance with some embodiments of the present disclosure. The integrated circuit 100 may include a clock input (C2CK/RST), a power input (VDD), a ground input (GND), and a plurality of general purpose inputs/outputs (I/Os) 101. The integrated circuit 100 includes a power on reset circuit 104 coupled to a controller core 102 and to debug/programming hardware 106. The controller core 102 may include one or more processor circuits, such as a microcontroller unit (MCU) or other processors, which may be configured to execute instructions and to process data. The controller core 102 may include flash memory, synchronous random access memory (SRAM), and an external memory (XRAM). The controller core 102 may be coupled to a special function register (SFR) bus 1008, which may be coupled to a system clock configuration module 110. The system clock configuration module 110 may include an oscillator 112, a low frequency oscillator 114, and a CMOS oscillator input 116 to receive an external clock signal. The system clock configuration module 110 may also include a multiplexer configured to select between the signals and to provide a system clock signal to the controller core 102. Further, the integrated circuit 100 may include an independent watchdog timer 118 coupled to the CMOS oscillator input 116, to the power supply input, and to the controller core 102.

In some embodiments, the independent watchdog timer 118 may be configured to monitor one or more processes associated with the controller core 102. The independent watchdog timer 118 may be reset regularly by instructions executed by the controller core 102. When the independent watchdog timer 118 is not cleared, a watchdog reset operation is activated, which functionality may reset one or more of the processors of the controller core 102. In some embodiments, the independent watchdog timer 118 may be a low energy peripheral module that can be configured to generate a system reset, in the case that it is not cleared by software before the given deadline (count or timer threshold). When the independent watchdog timer is cleared, the count value of the independent watchdog timer 118 may be set to zero. The reset of the independent watchdog timer 118 may be reset by software when the controller core 102 is running correctly. When the independent watchdog timer 118 exceeds a programmable threshold value, the independent watchdog timer 118 may generate a system reset signal, which indicates that the integrated circuit 100 is not operating correctly and that the controller core 102 has failed to reset the independent watchdog timer 118. The independent watchdog timer 118 may be controlled by the controller core 102 to verify that the controller core 102 is functioning and that the instruction thread is working. Since the instruction threads may communicate with one or more peripherals, the independent watchdog timer 118 may not trigger in response to failure of a peripheral device, unless the thread associated with the peripheral device fails or stalls.

The integrated circuit 100 may further include a port input/output (I/O) configuration circuit 120 having an input coupled to the SFR bus 108 and an output coupled to each of a plurality of port drivers 142, 144, and 146. The integrated circuit 1000 may further include analog peripherals 140, such as analog-to-digital converters (ADCs), digital-to-analog converters (DACs), analog multiplexers, temperature sensors, and comparators. The analog peripherals 140 may be coupled to the SFR bus 108.

The integrated circuit 100 may further include a digital peripherals circuit 122 including one or more UARTs 124, one or more timers 126 (including a peripheral watchdog timer (PWDT) 127), one or more programmable counter arrays (PCAs) 128, an I2C or SMBUS 130, a serial peripheral interface 132, an error detection circuit, such as a cyclic redundancy code (CRC) circuit 134, and the configurable logic circuitry 136. The configurable logic circuitry 136 may be coupled to one or more of the peripherals and to a priority crossbar decoder 138.

In some embodiments, the PWDT 127 may monitor one or more of the peripherals, including UARTs 124, PCAs 128, SPI 132, CRC 134, and one or more external peripherals coupled to one or more of the general purpose (GP) I/Os 101. The PWDT 127 may be configured to identify when a peripheral has locked up and is no longer functioning in an environment where the peripheral subsystem is operating autonomously relative to the processor core 102. The PWDT 127 may be configured to detect a locked-up peripheral device without waking the processor core 102 and even when the processor core 102 is locked up or not functioning.

In some embodiments, the peripheral device may be self-triggering. In some embodiments, a chain of operations to be monitored by the PWDT 127 may include the triggering mechanism, the consumer of the trigger (i.e., the circuit or component that may utilize data from the peripheral or that may be responsive to the peripheral), and the storage of the resulting data into a memory (such as RAM, a register, or another memory). The chain of operations may occur with no intervention by the processor core 102. Thus, if for some reason a peripheral may be locked up (e.g., a soft error, power failure, etc.), the PWDT 127 may be configured to one or more of the peripherals to detect activity. If activity is not detected within a period of time, the PWDT 127 may trigger an interrupt to the processor core 102. If the interrupt is not serviced by the processor core 102 within a threshold period of time, the PWDT 127 may trigger a reset event, which may reset the peripheral device, the processor core 102, other circuits, or any combination thereof.

In some embodiments, the PWDT 127 may provide a hardware implementation for detection of peripheral lock up or error, which may be easier to program, since the PWDT 127 may be coupled to each of the peripherals and since the programmable feature of the PWDT 127 may be the count threshold. In some embodiments, the PWDT 127 also allows for recovery of the frozen or locked up peripheral with lower power consumption, since the processor core 127 does not need to be woken up regularly to determine the state of the peripherals. Further, in some embodiments, the PWDT 127 also circumvents the possibility of a software bug locking up the peripheral due to task death or some other event.

In some embodiments, the peripherals may be treated as autonomous with very little interaction with the processor core 102. In the illustrated example of FIG. 1, the PWDT may be configured to identify stuck peripherals or to identify stuck event chains and to initiate a reset operation so that the entire integrated circuit 100 does lock up.

In some embodiments, the PWDT 127 may look at a multitude of peripherals and may trigger a reset event based when any one of the peripherals ceases operation. In some embodiments, the PWDT 127 may be configured to detect events in a chain of events and to determine that each of the events is triggered. When each event in the chain is triggering, the PWDT 127 can be reset and may continue to watch the peripherals. When any one of the events in the chain does not trigger, the PWDT 127 can generate an alert, such as an interrupt. The interrupt may be provided to the controller core 102. If the interrupt is not serviced within a period of time, the PWDT 127 may initiate at least one of a peripheral reset operation, a processor reset operation, an operation to determine a cause of the failure to trigger, another operation, or any combination thereof.

In some embodiments, the PWDT 127 may initiate a reset or restart operation that may be specific to the peripheral that locked up. In some embodiments, the PWDT 127 may provide the signal (alert) to a control circuit that may be configured to investigate the inactivity to determine a cause (or a state of the peripheral), and optionally to determine a suitable response to reset (or resuscitate) the peripheral. In some embodiments, the PWDT 127 or a control circuit coupled to the PWDT 127 may send one or more signals to the inactive peripheral to determine whether the peripheral is still active or is stuck. If the PWDT 127 or the control circuit does not receive a response, the peripheral may be stuck and the PWDT 127 or the control circuit may initiate a reset operation to reset the peripheral without waking the controller core 102. Other embodiments are also possible.

Figure 2A:
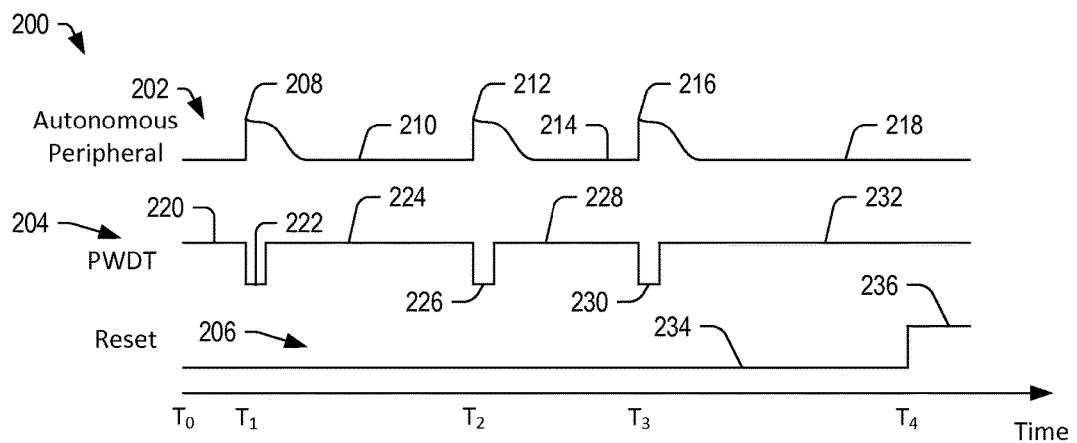
FIG. 2A is a timing diagram including a peripheral watchdog timer signal, a signal associated with an autonomous peripheral device, and a reset signal, in accordance with some embodiments of the present disclosure.

FIG. 2A is a timing diagram 200 including a peripheral watchdog timer signal 204, a signal 202 associated with an autonomous peripheral device, and a reset signal 206, in accordance with some embodiments of the present disclosure. The signal 202 may include a triggering event 208 followed by a period 210 of low-activity or no-activity. The signal 202 may further include a triggering event 212 followed by a period 214 of low-activity or no-activity. The signal 202 may further include a triggering event 216 followed by period 218 of low-activity or no-activity. In the illustrated example, the triggering events 208, 212, and 216 are depicted as pulses of short duration; however, triggering events may be represented by other types of signals.

The PWDT signal 204 may include logic high portions 220, 224, 228, and 232, and logic low portions 222, 226, and 230. While the PWDT signal 204 is at a logic high level, the PWDT 127 may increment a count. The reset signal 206 may be at a logic low level 234 for a period of time, and may remain at a logic low level unless a triggering event does not happen within a period of time. In an example, the reset signal 206 may be logic low until, after reset of the PWDT signal 204, the PWDT signal 204 remains at a logic high level for a period of time that exceeds a threshold (without resetting in response to a triggering event). After the period of time exceeds the threshold, the reset signal 204 may transition to a logic high level (as shown at 236).

In some embodiments, the transition of the reset signal 206 from logic low to logic high may provide an alert to initiate an operation to restore the peripheral to operation, to wake the processor core 102, to trigger another circuit, or any combination thereof. In some embodiments, while the PWDT signal 204 is at a logic high level, the PWDT 127 may increment its count in conjunction with a timing signal, such as a clock signal or local oscillator signal. An example of a timing diagram showing the increasing PWDT signal is described below with respect to FIG. 2B.

Figure 2B:
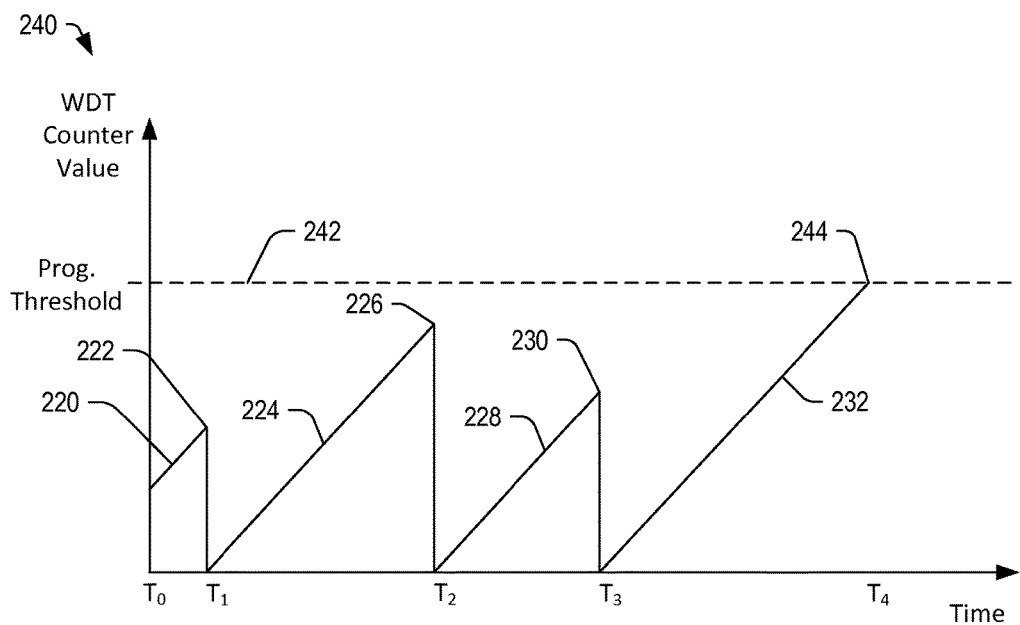
FIG. 2B is a graph of the count of the peripheral watchdog timer over time corresponding to the timing diagram of FIG. 2A, in accordance with some embodiments of the present disclosure.

FIG. 2B is a graph 240 of the count of the peripheral watchdog timer over time corresponding to the diagram 200 of FIG. 2A, in accordance with some embodiments of the present disclosure. The graph 240 includes a programmable threshold 242 corresponding to a counter value. From a first time ($T_0$) to a second time ($T_1$), the PWDT 127 may increment a count value as indicated at 246. At the second time ($T_1$) corresponding to the triggering event 208 (in graph 200), the PWDT 127 may reset its count value, transitioning from a peak value at 248 to a zero value.

From the second time ($T_1$) to a third time ($T_2$), the PWDT 127 may increment the count value as indicated by the sloped line at 250. At the third time ($T_2$) corresponding to the triggering event 212 (in graph 200), the PWDT 127 may reset its count value, transitioning from a peak value at 252 to a zero value. From the third time ($T_2$) to a fourth time ($T_3$), the PWDT 127 may increment the count value as indicated by the sloped line at 254. At the fourth time ($T_3$) corresponding to the triggering event 216 (in graph 200), the PWDT 127 may reset its count value, transitioning from a peak value at 256 to a zero value.

From the fourth time ($T_3$) to a fifth time ($T_4$), the PWDT 127 may increment the count value as indicated by the sloped line at 258. In this instance, the count value increases until it crosses the programmable threshold 242 at fifth time ($T_4$). The intersection of the sloped line 258 and the programmable threshold 242 is generally indicated at 244.

Once the count value of the PWDT 127 exceeds the programmable threshold 242 at 244, the PWDT 127 may send an alert to the processor core 102, to a control circuit, to another circuit, or any combination thereof. When the count value of the PWDT 127 cross the programmable threshold 242, at least one of the peripherals failed to provide data to one of the GPIOs 101, which failure may indicate that at least one of the peripherals has locked up. In response to the alert, the processor core 102, the control circuit, the other circuit, or any combination thereof may initiate a restart or reset operation. In some embodiments, the alert may cause the processor core 102 to restart or reset.

While the examples of FIGS. 2A and 2B depict the PWDT 127 incrementing a count value, in other embodiments, the PWDT 127 may decrement the count value, counting down from a starting value. In some embodiments, when the count of the PWDT 127 crosses a threshold (either from below the threshold until the count exceeds the threshold or from above the threshold until the count falls below the threshold), the PWDT 127 may generate the alert.

In the above-examples, the PWDT 127 may send an alert to the processor core 102, the control circuit, the other circuit, or any combination thereof. In some embodiments, the alert may be an interrupt. In some embodiments, the alert may be a signal that may cause the receiving circuit(s) to initiate an interrupt. In some embodiments, the controller core 102 may service the interrupt. If the interrupt is not serviced within a period of time, the PWDT 127 may initiate a restart or reset operation. Otherwise, the servicing of the interrupt may reset the PWDT 127.

In some embodiments, the PWDT 127 may be part of a larger circuit that includes other timers, such as a watchdog timer configured to monitor operation of the controller core, as well as other timers. Further, the circuit 100 in FIG. 1 is not the only circuit implementation in which the PWDT 127 may be used. Other circuits are also possible. One possible example of a circuit that may include a PWDT circuit is described below with respect to FIG. 3.

Figure 3:
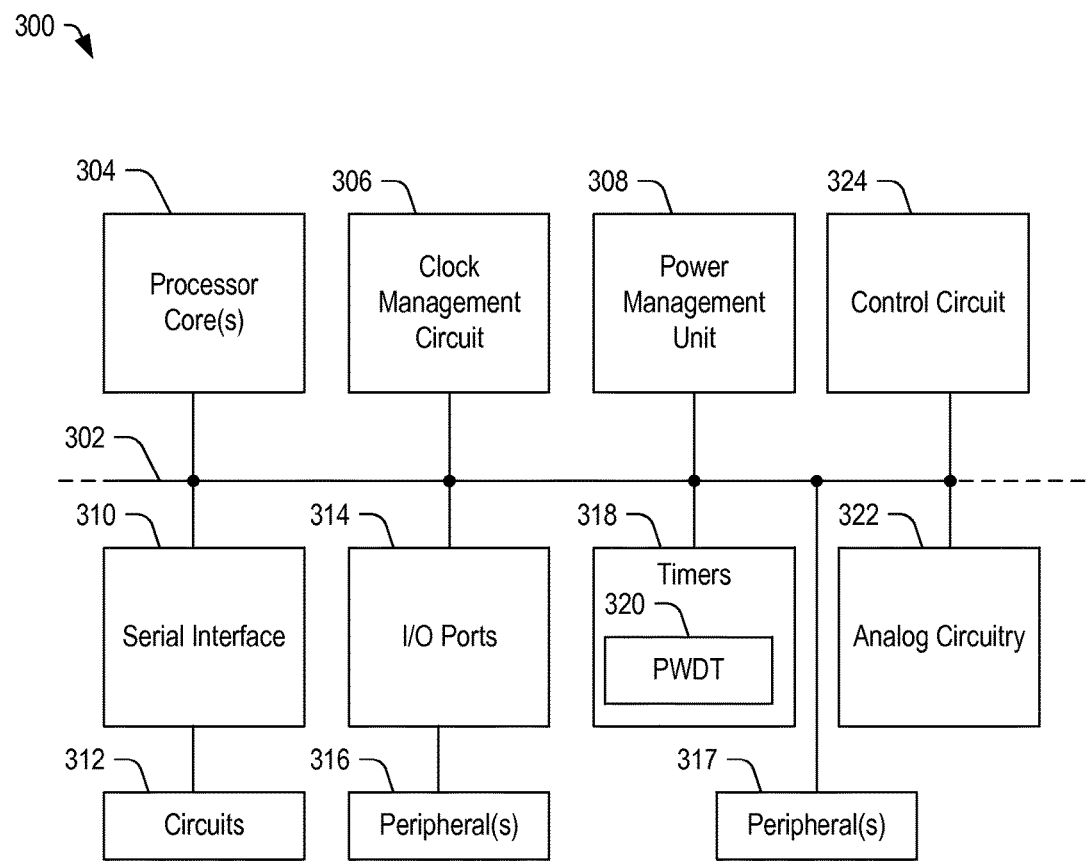
FIG. 3 is a block diagram of a circuit including a peripheral watchdog timer, in accordance with some embodiments of the present disclosure.

FIG. 3 is a block diagram of a circuit 300 including a PWDT 320, in accordance with some embodiments of the present disclosure. The circuit 300 may include the communications bus 302 coupled to one or more processor cores 304, a clock management circuit 306, and a power management circuit 308. In some embodiments, the power management circuit 308 may be configured to reduce an apparatus's clock speed, turn off the clock, reduce power, turn off power, or any combination thereof with respect to part of a circuit or all components of a circuit. Further, the power management circuit 308 may be configured to turn on a clock, increase a clock rate, turn on power, increase power, or any combination thereof in response to a transition from an inactive state to an active state (such as when the one more processor cores 304 transition from a low-power or idle state to a normal operating state).

The communication bus 302 may also be coupled to one or more circuits 312 through a serial interface 310, to one or more peripherals 316 through an input/output (I/O) ports circuit 314, to one or more peripherals 317, to analog circuitry 322, and to a control circuit 324. In some embodiments, the control circuit 324 may include control logic, a state machine, or other circuitry configured to initiate a reset operation of at least one of a peripheral 316, a peripheral 317, a circuit 312, the processor core 304, other circuits, or any combination thereof.

In some embodiments, the circuit 300 may also include a plurality of timers 318 coupled to the communications bus 302. The plurality of timers 318 may include a PWDT 320. In some embodiments, the PWDT 320 may be configured to monitor activity at one or more (or all) of the I/O ports 314, at the serial interface 310, at the one or more peripherals 317, or any combination thereof. In response to detecting activity, the PWDT 320 may be reset. If the PWDT 320 reaches a count value that exceeds a threshold, the PWDT 320 may detect a peripheral or an associated process that has locked up or failed and may communicate an alert to at least one of the processor cores 304, the control circuit 324, another circuit, or any combination thereof.

In a particular illustrative example, the PWDT 320 may determine that one of the peripherals 316 has locked up because the count of the PWDT 320 exceeded a threshold before activity was detected at an associated one of the I/O ports 314. The PWDT 320 may generate a signal in response to detecting the locked up peripheral. In response to receiving the signal from the PWDT 320, the control circuit 324 may initiate an operation to reset the locked-up peripheral 316 by communicating with the peripheral 316 via the I/O ports 314. The control circuit 324 may reset or restart the peripheral 316, unlocking the peripheral 316 without involving the processor core 304. In some embodiments, if the reset fails, the control circuit 324 may send an alert to the processor core 304 to initiate a processor-level reset. Further, in some embodiments, the control circuit 324 may investigate the inactivity (state) of the peripheral 316, determine a cause (or not), and selectively initiate a reset operation to restore the peripheral to an operating state. In a particular example, the control circuit 324 may send a sequence of signals to the I/O port associated with the peripheral and may monitor responses to determine a state of the peripheral. If the peripheral fails to respond, the control circuit 324 may wake the processor core 304 to reset the peripheral or to restart the processor core.

In some embodiments, the control circuit 324 may initiate a reset operation by sending one or more signals to at least one of the peripherals 316 via the I/O ports. The one or more signals may cause at least one of the peripherals 316 to restart or reset. In some embodiments, the PWDT 320 may receive a clock signal and may count a number of clock pulses. In some embodiments, the PWDT 320 may generate an alert when the value of the PWDT 320 exceeds a threshold value. Alternatively, the PWDT 320 may count down and may generate an alert when the value of the PWDT 320 reaches zero or some other threshold. The PWDT 320 may monitor activity at the I/O ports 314 or at other circuits or may monitor a chain of activities. In the event that the activity or chain of activities is detected before the count of the PWDT 320 reaches the threshold, the PWDT 320 may be reset and the count (up or down) will begin again without sending the alert.

In some embodiments, the circuit 300 may be a representative example of a portion of the circuit 100 of FIG. 1. For example, a bus 302 of the circuit 300 may correspond to the SFR bus 108 in FIG. 1, and circuit 300 may include other circuitry to couple the bus 302 or the PWDT 320 to other circuits, including external circuits coupled to the circuit 300 through GPIOs, such as GPIOs 101 in FIG. 1. Other embodiments are also possible.

In some embodiments, the PWDT may include an input to receive a clock signal, and a counter responsive to the clock signal to increment or decrement a count. The PWDT may also include a comparator to compare the count to a threshold and may include a signal generator coupled to an output of the comparator and configured to selectively generate an interrupt in response to the output signal from the comparator. One possible example of a PWDT is described below with respect to FIG. 4.

Figure 4:
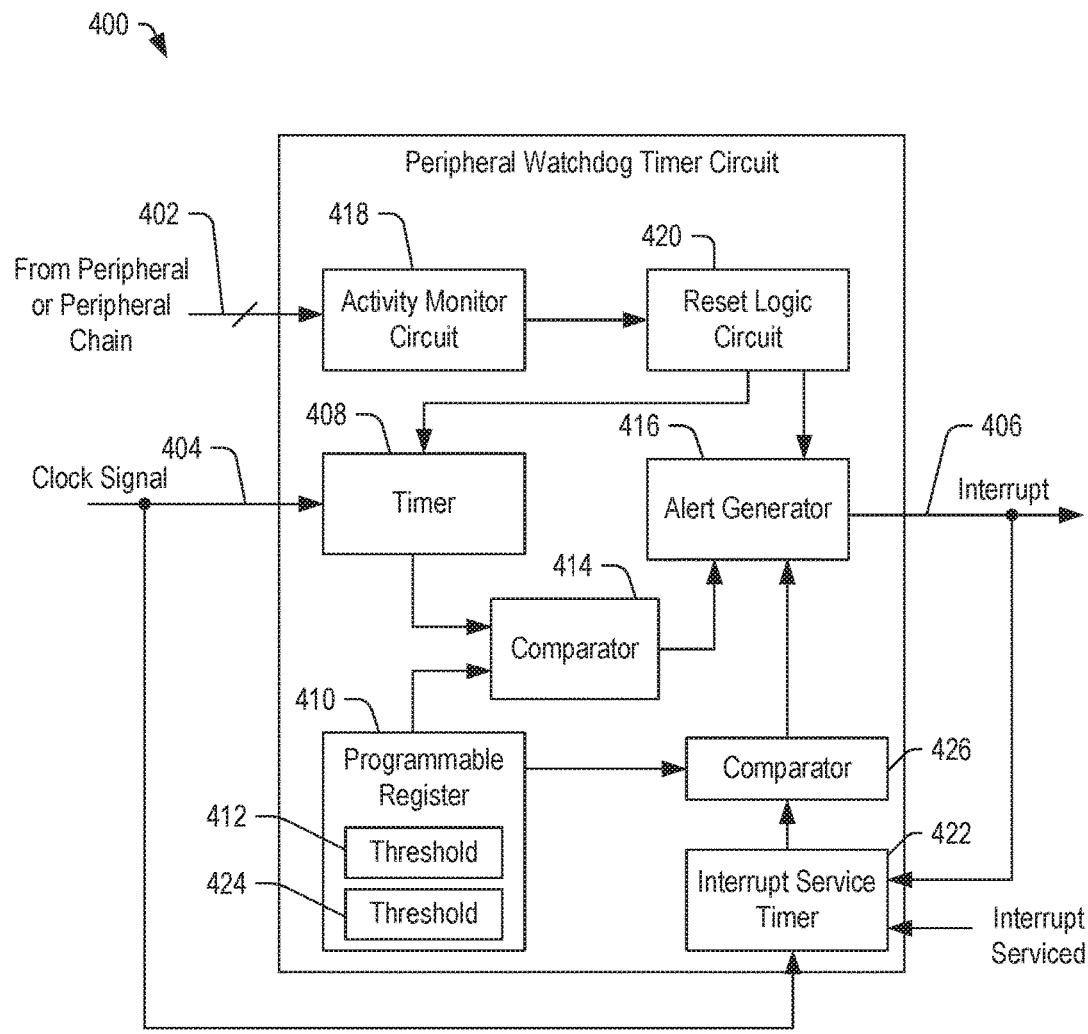
FIG. 4 is a block diagram of a peripheral watchdog timer circuit, in accordance with some embodiments of the present disclosure.

FIG. 4 is a block diagram of a peripheral watchdog timer (PWDT) circuit 400, in accordance with some embodiments of the present disclosure. The PWDT 400 may be an implementation of the PWDT 127 in FIG. 1 or of the PWDT 320 in FIG. 3. The PWDT 400 may include one or more first inputs 402 to receive signals from one or more peripherals, from points in a chain of peripheral operations, from another source, or any combination thereof. The PWDT 400 may further include a second input 404 to receive a clock signal, which may be provided by an external clock source, a local oscillator, a radio frequency synthesizer, another local timing signal source, or any combination thereof. The PWDT 400 may further include an output 406 configured to provide an output signal or alert. In some embodiments, the output signal may be an interrupt, which may be written to a register or provided to a reset input of another circuit.

The PWDT 400 may include a timer circuit 408 coupled to the second input 404 and configured to receive the clock signal. The timer circuit 408 may include an output coupled to a first input of a comparator 414. The PWDT 400 may further include a programmable register 410 configured to store at least one threshold value 412. The programmable register 410 may include an output coupled to a second input of the comparator 414, which may include an output coupled to an input of an alert generator circuit 416. The alert generator circuit 416 may include an output coupled to the output 406. The PWDT 400 may also include an activity monitor circuit 418 coupled to the one or more first inputs 402. The activity monitor circuit 418 may include an output couple to an input of a reset logic circuit 420, which may include an output coupled to the timer circuit 408.

In some embodiments, the timer circuit 408 may increment or decrement a count in response to the clock signal, and may provide the count value to the first input of the comparator 414. The comparator 414 may receive the threshold 412 from the programmable register 410 and may produce an output signal corresponding to the result of the comparison, which output signal may be provided to the alert generator 416. When the count value of the timer circuit 408 exceeds the threshold 412, the comparator 414 produces an output signal enabling the alert generator 416 to generate an interrupt at the output 406.

The activity monitor circuit 418 may monitor activity at the one or more inputs 402. Any change or signal at the one or more inputs 402 may indicate that an associated peripheral is still functioning. In some embodiments, the activity monitor circuit 418 may be configured to monitor a chain of activities, including receipt of a signal, consumption of the signal to produce data, and movement of the data to a storage location (such as memory or a register). The activity monitor circuit 418, upon detection of such activity, may provide a signal indicating such detection to the reset logic circuit 420, which may provide a reset signal to the timer circuit 408. In response to the reset signal, the timer circuit 408 may reset its count value. In some embodiments, such as where the activity monitor circuit 418 is configured to monitor a chain of operations, the activity monitor circuit 418 may provide the signal only when each of the operations of the chain is completed.

In some embodiments, the activity monitor circuit 418 may be configured to monitor activity at each of the one or more inputs 402. In some embodiments, if activity is not detected at any one of the one or more inputs 402, the activity monitor circuit 418 may not send a signal to the reset logic circuit 420. If activity is detected at some but not all of the one or more inputs 402, the activity monitor circuit 418 may send to the reset logic circuit 420 a signal indicating which of the inputs may have failed to show activity. In response to the signal, the reset logic circuit 420 may reset the timer circuit 408 and may communicate data to the alert generator 416, which may generate an interrupt or alert configured to reset a specific peripheral, to initiate a reset operation for one or more circuits, and so on. The reset logic circuit 420 may be configured to determine the peripheral that failed to indicate activity and may communicate that information to the alert generator 416, which may be configured to provide an alert or interrupt specific to the failed peripheral, circuit, or activity being monitored.

In some embodiments, the threshold 420 may define a time interval, and the timer circuit 408 may count each clock cycle. The comparator 414 may compare the count to the threshold 420 and may generate an inactivity event signal when the count exceeds the threshold or when the count falls below the threshold (depending on whether the timer is incrementing or decrementing the count).

In some embodiments, the PWDT 400 may include other components or may omit components. In an example, the PWDT 400 may include an additional circuit configured to generate multiple output signals in response to detection of inactivity. In some embodiments, the output of the comparator 414 may be coupled to the output 406 without the intervening alert generator 416. In such an embodiment, the output of the comparator 414 may be an alert. In other embodiments, the PWDT 400 may include multiple activity monitors 408, each of which may be configured to monitor a particular I/O, a particular peripheral, a particular chain of operations, or any combination thereof. In such an embodiment, failure to detect activity by any one of the activity monitors could cause the PWDT 400 to generate an alert signal.

In some embodiments, the PWDT 400 may further include an interrupt service timer 422 coupled to the output 406 and configured to initiate a counting operation in response to the interrupt. The PWDT 400 may further include a comparator 426 including an input coupled to an output of the interrupt service timer 422, a second input coupled to the programmable register 410 to receive a second threshold 424, and an output coupled to the alert generator 416. In response to a signal at the output of the comparator 426, the alert generator 416 may generate a reset signal to initiate a reset operation, for example, to reset the controller core 102, to reset a processor, to reset a peripheral, or any combination thereof. If the interrupt is serviced before the count of the interrupt service timer 422 exceeds the threshold 424, the interrupt service timer 422 may be reset and may be turned off until a next interrupt appears at the output 406.

In some embodiments, the interrupt service timer 422 may be separate from the PWDT circuit 400. In some embodiments, the threshold 412 and the threshold 424 may be the same. In other embodiments, the threshold 424 may be shorter than the threshold 412. In still other embodiments, the threshold 424 may be longer than the threshold 412.

In some embodiments, the reset logic circuit 420 may be configured to provide different signals in response to detection of inactivity, depending on the particular peripheral or operation. For example, a locked up peripheral that is little used may receive a different level of attention than a locked up process or peripheral that has a higher priority. Such priorities may be configured over time based on processor activities, and other activities.

Figure 5:
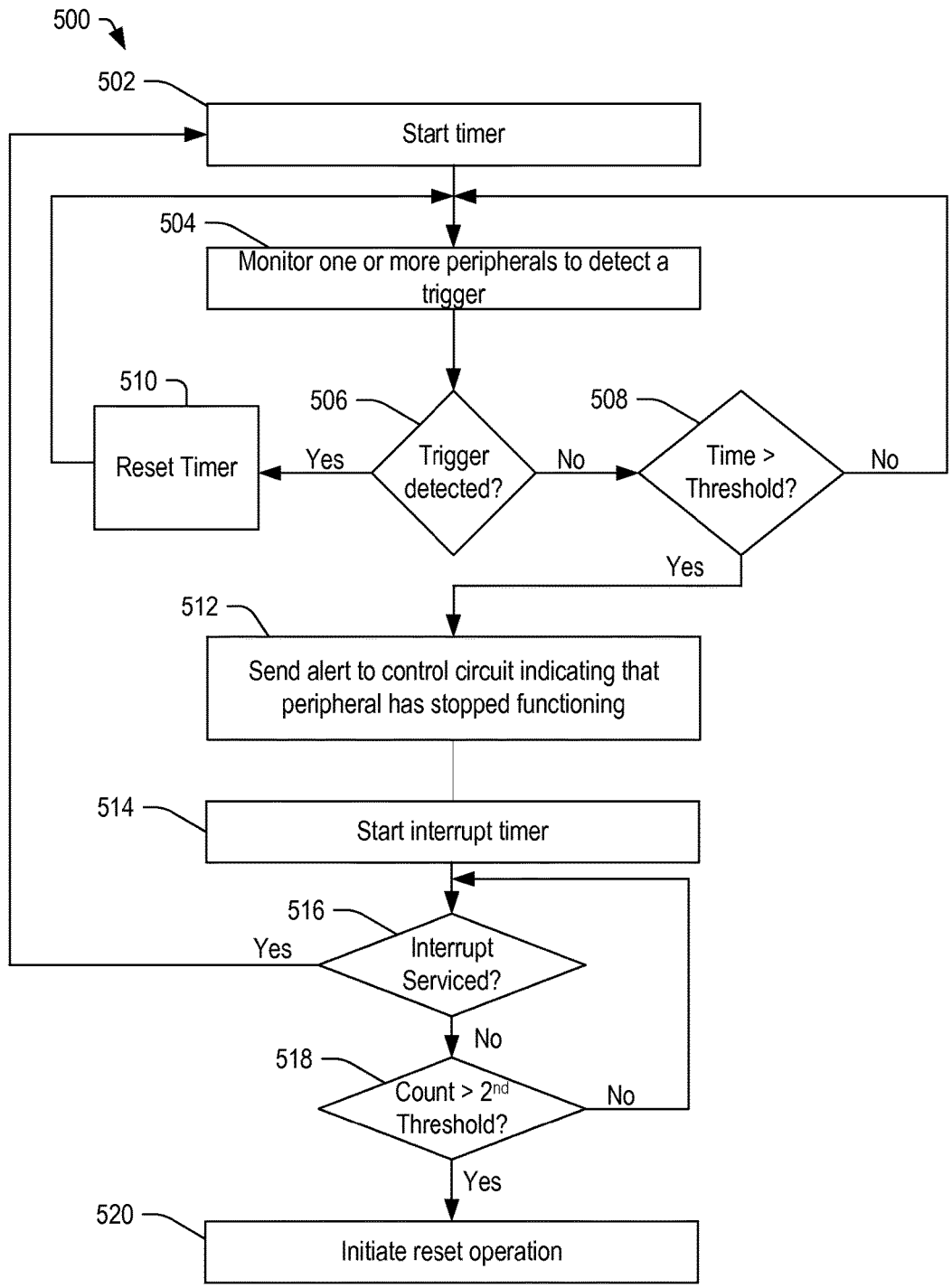
FIG. 5 is a flow diagram of a method of monitoring a peripheral device using a peripheral watchdog timer, in accordance with some embodiments of the present disclosure.

FIG. 5 is a flow diagram of a method 500 of monitoring a peripheral device using a peripheral watchdog timer, in accordance with some embodiments of the present disclosure. At 502, a timer may be started. The timer may be started or reset on startup, in response to detecting a connection to a peripheral device, or in response to another signal. In some embodiments, the timer may adjust a count of a peripheral watchdog timer circuit in response to a clock signal. The count may be incremented or decremented, depending on the implementation.

The method 500 may further include monitoring one or more peripherals to detect a trigger or triggering event, at 504. In some embodiments, the timer may include a PWDT, and the one or more peripherals may be coupled to the PWDT through a bus, through I/Os, or any combination thereof. In some embodiments, the peripheral may be an autonomous peripheral configured to operate independently from a processor core. In some embodiments, the autonomous peripheral may include at least one of a programmable counter, a sensor, and an error detection circuit. In some embodiments, an activity monitor associated with the PWDT or associated with another circuit may monitor at least one peripheral circuit to detect activity. The monitoring may be achieved by monitoring activity at an input, by monitoring a register, or by monitoring a process. In some embodiments, monitoring the one or more inputs may include monitoring at least one peripheral circuit. In some embodiments, such monitoring may include monitoring a chain of operations associated with the at least one peripheral circuit. The chain of operations may include receipt of a triggering signal, consumption of the triggering signal to produce data, and movement of the data to a memory. The PWDT may generate the alert signal when the count crosses the threshold before the chain of operations is completed.

The method 500 may further include determining if a trigger is detected, at 506. The trigger may be a signal or a voltage level at one or more of the inputs, a data value in a memory, such as a register, or another signal. If a trigger is detected, the method 500 may include resetting the timer. The timer may be a PWDT configured to count a number of clock cycles or time periods before a signal is received from a peripheral. The count value of the PWDT may be reset in response to detecting a signal at one or more of the inputs. The method 500 may then return to 504 to monitor one or more inputs to detect a trigger.

Returning to 506, if no trigger is detected, the method 500 may include determining if the time (or count) of the timer exceeds a threshold, at 508. If the time is less than the threshold, the method 500 may return to 504 to monitor one or more inputs to detect a trigger. Otherwise, if the time exceeds the threshold at 508, the method 500 may include sending an alert to a control circuit indicating that the peripheral has stopped functioning, at 512. Thus, at 512, the method 500 may include generating an alert signal when the count crosses a threshold before detecting the activity. In some embodiments, the control circuit may be a processor core, a microcontroller unit (MCU), a state machine, another circuit, or any combination thereof. The alert may include a time stamp and an indication of an I/O port associated with the failure. In some embodiments, the control circuit may interact with the I/O port to reset or restart an associated peripheral.

In some embodiments, the PWDT circuit may be configured to monitor a chain of events associated with the at least one peripheral and to generate an alert signal when the count exceeds a threshold count before the chain of event is completed. In some embodiments, a control circuit may be coupled to the peripheral watchdog timer circuit and may be configured to reset at least one of a processor and a peripheral in response to the alert signal. In some embodiments, the control circuit may be configured to investigate the at least one of the plurality of peripherals to determine a state, and optionally to determine a suitable response to reset the at least one of the plurality of peripherals.

In response to the alert, the method 500 may include starting an interrupt timer, at 514. In this instance, the alert may be an interrupt or may cause another circuit to generate an interrupt to the CPU, another processor, a controller core, another circuit, or any combination thereof. The interrupt timer may be part of the PWDT circuit or may be a separate timer circuit. If the interrupt is serviced at 516, the method 500 returns to 502 and the timer is started. Otherwise, if the interrupt is not serviced at 516, the method 500 determines if the count of the interrupt timer exceeds a second threshold, at 518. If not, the method 500 returns to 516 to determine if the interrupt has been serviced. In some instances, if the interrupt is not serviced within a period of time, there may be a problem with the controller core, a CPU, another processor, another circuit, or any combination thereof. In response to the interrupt, at 518, if the count exceeds the second threshold, the method 500 includes initiating a reset operation at 520. The reset operation may restart the controller core 102, a CPU, a processor, another circuit, or any combination thereof.

In conjunction with the apparatuses, the circuits, the systems, and the methods described above with respect to FIGS. 1-5, a peripheral watchdog timer circuit is disclosed that may be configured to monitor one or more I/Os or operations to detect activity and, when no activity is detected within a period of time, to generate an alert. In some embodiments, the alert may be an interrupt. If the interrupt is not serviced within a period of time, the peripheral watchdog timer circuit may initiate a reset operation. Otherwise, if the interrupt is serviced within a period of time, the peripheral watchdog timer circuit may be reset. In some embodiments, the reset operation may be specific to a particular peripheral that is locked up. In some embodiments, the reset operation may cause a processor core to reset or restart. In some embodiments, the reset operation may cause a circuit to investigate the inactivity, such as by initiating a wakeup sequence involving the peripheral device.

Although the present invention has been described with reference to preferred embodiments, workers skilled in the art will recognize that changes may be made in form and detail without departing from the scope of the invention.

What is claimed is:

1. A circuit comprising:
a plurality of peripherals; and
a peripheral watchdog timer circuit coupled to at least one of the plurality of peripherals, the peripheral watchdog timer circuit configured to count clock cycles and concurrently to detect activity associated with at least one of the plurality of peripherals, the peripheral watchdog timer circuit configured to reset a count in response to detecting the activity.

2. The circuit of claim 1, wherein the peripheral watchdog timer circuit is configured to generate an alert signal when the count exceeds a threshold count before detecting the activity.

3. The circuit of claim 2, wherein:
the alert signal includes an interrupt; and
the peripheral watchdog timer circuit is configured to initiate a reset operation when the interrupt is not serviced within a period of time.

4. The circuit of claim 1, wherein the at least one of the plurality of peripherals comprises an autonomous peripheral configured to operate independently from a processor core, the autonomous peripheral including at least one of a programmable counter, a sensor, and an error detection circuit.

5. The circuit of claim 1, wherein the peripheral watchdog timer circuit is configured to monitor a chain of events associated with at least one peripheral and to generate an alert signal when the count exceeds a threshold count before the chain of events is completed.

6. The circuit of claim 5, further comprising a control circuit coupled to the peripheral watchdog timer circuit and configured to reset at least one of a processor and a peripheral in response to the alert signal.

7. The circuit of claim 5, further comprising a control circuit coupled to the peripheral watchdog timer circuit and, in response to the alert signal, the control circuit configured to investigate the at least one of the plurality of peripherals to determine a state, and optionally to determine a suitable response to reset at least one of the plurality of peripherals.

8. A circuit comprising:
a plurality of peripherals; and
a peripheral watchdog timer circuit coupled to at least one of the plurality of peripherals, the peripheral watchdog timer circuit configured to count clock cycles and concurrently to detect activity associated with at least one of the plurality of peripherals, the peripheral watchdog timer circuit configured to generate an alert signal when a count exceeds a threshold count before detecting the activity.

9. The circuit of claim 8, wherein:
the alert signal includes an interrupt; and
the peripheral watchdog timer circuit is configured to initiate a reset operation when the interrupt is not serviced within a period of time.

10. The circuit of claim 8, wherein the peripheral watchdog timer circuit is configured to reset the count in response to detecting the activity.

11. The circuit of claim 8, further comprising a processor core coupled to the plurality of peripherals and to the peripheral watchdog timer circuit, the processor core configured to reset in response to the alert signal.

12. The circuit of claim 8, further comprising:
a control circuit coupled to the peripheral watchdog timer circuit; and
wherein, in response to the alert signal, the control circuit is configured to:

investigate at least one of the plurality of peripherals to determine a state; and selectively reset at least one of a processor and the peripheral in response to determining the state.

13. The circuit of claim 8, wherein the at least one of the plurality of peripherals comprises an autonomous peripheral configured to operate independently from a processor core.

14. The circuit of claim 8, wherein the peripheral watchdog timer circuit is configured to monitor a chain of events associated with at least one peripheral and to generate the alert signal when the count exceeds the threshold count before the chain of events is completed.

15. A method comprising:
adjusting a count of a peripheral watchdog timer circuit in response to a clock signal;
monitoring at least one peripheral circuit to detect activity; and
generating an alert signal when the count crosses a threshold before detecting the activity.

16. The method of claim 15, wherein adjusting the count comprises decrementing the count in response to each clock cycle of the clock signal.

17. The method of claim 15, wherein adjusting the count comprises incrementing the count in response to each clock cycle of the clock signal.

18. The method of claim 15, further comprising resetting the count when the activity is detected before the count crosses the threshold.

19. The method of claim 15, wherein monitoring at least one peripheral circuit comprises:
monitoring a chain of operations associated with at least one peripheral circuit, the chain including receipt of a triggering signal, consumption of the triggering signal to produce data, and movement of the data to a memory; and
generating the alert signal when the count crosses the threshold before the chain of operations is completed.

20. The method of claim 15, further comprising:
monitoring an interrupt associated with the alert to determine when the interrupt is serviced; and
initiating a reset operation when the interrupt is not serviced within a period of time.

21. The method of claim 15, further comprising:
investigating the at least one peripheral circuit to determine a state; and
selectively initiating one of an interrupt operation to wake a processor to reset the at least one peripheral and a reset operation to reset the at least one peripheral.

* * * * *